(12) United States Patent
Sellers

(10) Patent No.: US 6,702,273 B1
(45) Date of Patent: *Mar. 9, 2004

(54) NON-SKID WOODEN CUTTING BOARD

(76) Inventor: Kathleen R. Sellers, 3594 S. Ocean Blvd., #301, Highland Beach, FL (US) 33487

( * ) Notice: Subject to any disclaimer, the term of this patent is extended or adjusted under 35 U.S.C. 154(b) by 0 days.

This patent is subject to a terminal disclaimer.

(21) Appl. No.: 09/683,678

(22) Filed: Feb. 1, 2002

Related U.S. Application Data

(63) Continuation-in-part of application No. 09/661,072, filed on Sep. 13, 2000, now Pat. No. 6,478,292.

(51) Int. Cl.⁷ .................................................. B23Q 3/00
(52) U.S. Cl. ................................ 269/289 R; 269/302.1; 269/286; 269/285
(58) Field of Search ......................... 269/289 R, 302.1, 269/900, 285, 286

(56) References Cited

U.S. PATENT DOCUMENTS

| | | | | |
|---|---|---|---|---|
| 4,346,875 A | * | 8/1982 | Spencer et al. | 269/302.1 |
| 5,326,086 A | * | 7/1994 | Radencic | 269/302.1 |
| 5,485,937 A | * | 1/1996 | Tseng | 269/302.1 |
| 5,626,067 A | * | 5/1997 | Lothe | 269/289 R |
| 5,916,031 A | * | 6/1999 | Casillan | 472/85 |
| 6,276,675 B1 | * | 8/2001 | Shamoon | 269/289 R |
| 6,478,292 B1 | * | 11/2002 | Sellers | 269/289 R |

\* cited by examiner

*Primary Examiner*—Lee D. Wilson
(74) *Attorney, Agent, or Firm*—Malin, Haley & DiMaggio, P.A.

(57) ABSTRACT

A wooden cutting board for cutting vegetables, bread and other food stuffs, especially useful on a dry or wet countertop for providing improved traction for the cutting board, comprising a wooden cutting board body having a plurality of traction plates, one attached substantially in each corner, each of said traction plates having a plurality of non-skid projections for increasing the surface area between the cutting board and the countertop surface, all of which are spaced apart to permit liquid to flow in between each of said traction plates attached to apertures in the cutting board through a plurality of legs that have circular attachment disks mounted therein for firm attachment of the traction plates to the cutting board surface.

6 Claims, 4 Drawing Sheets

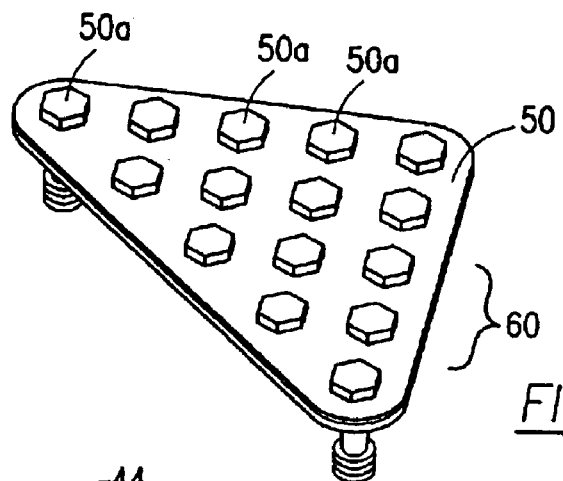
FIG. 5
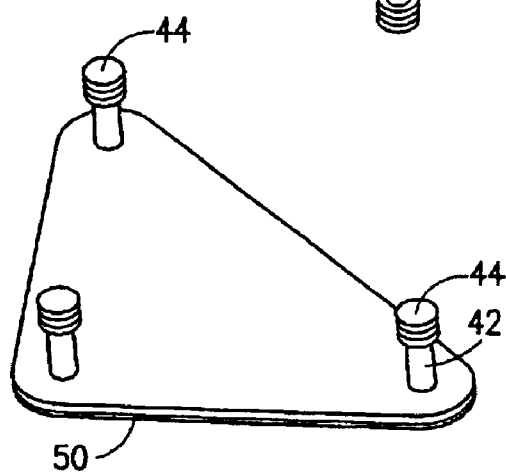
FIG. 6
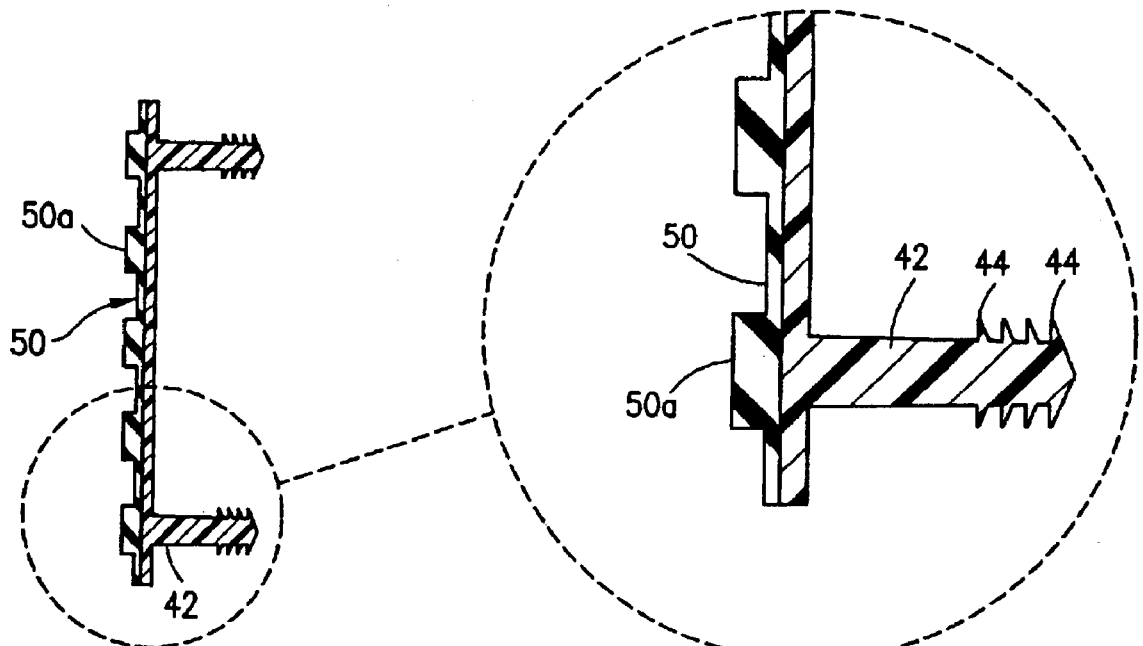
FIG. 7
FIG. 8

NON-SKID WOODEN CUTTING BOARD

CROSS REFERENCE TO RELATED APPLICATIONS

This application is a continuation-in-part of U.S. Ser. No. 09/661,072, filed on Sep. 13, 2000, now U.S. Pat. No. 6,478,292 issued Nov. 12, 2002.

BACKGROUND OF INVENTION

1. Field of the Invention

The present invention relates to a wooden cutting board commonly used in the preparation of food, and more specifically, to a wooden cutting board utilizing a plurality of insertable non-skid traction plates that sufficiently raise the cutting board above a countertop surface and provide spaced, frictional surface projections to insure non-slip traction during the cutting process, even on wet surfaces.

2. Description of the Prior Art

Cutting boards are well known in the art and are primarily designed to provide a separate rigid surface on which to cut food while protecting the countertop surface from being marred by a knife. The use of wood for the cutting board has been traditional. Wood is a viable material as a cutting board because it is rigid but softer than the knife blade material preventing damage to the sharpness of the knife blade. Wood is also decorative.

Cutting food stuffs on a kitchen countertop can be a potentially dangerous task, i.e. using a sharp knife or cleaver in one hand with pressure against often times frozen, hard, slippery or cumbersome items held in the other hand, often in a wet environment created from liquids seeping from items during the cutting process and invariably without use of any safety or protective equipment or gear. The household kitchen countertop is the most frequent surface on which the cutting board is placed. A flat wooden cutting board mounted against a dry or wet formica countertop can be hazardous and prone to movement of the cutting board during the act of cutting. On dry or wet surface, small area traction feet mounted on a cutting board are ineffective. It is Applicant's position that there is not enough traction surface area with three or four small feet on one side of a cutting board, to make much of a difference. It is also important that in dealing with a wet surface area for mounting the board, there should be sufficient space under the board for liquid to escape away from the traction surfaces into adjacent areas.

The present invention overcomes these problems by providing a wooden cutting board with a plurality of improved traction forming plates, each strategically mounted on the bottom of the board for stability and traction. Each traction plate has an array of non-skid projections that are spaced apart, allowing liquids compressed by each projection to escape around the projection so as to not interfere with the traction process. The non-skid projections have flat end surface areas or an array of edges to engage the counter top surface, directly resulting in a large cumulative contact/non-skid surface area to prevent movement of the cutting board, even on wet countertops.

Parameters to be reviewed for providing maximum traction for the cutting board on a dry or wet surface would include the surface area of each traction projection, total area of all traction projections, geometric spatial orientation of each projection, the quantity and spacing between the traction projections and the overall surface area provided for by all traction projections and the surface non traction open area adjacent the traction projections that allow liquids to escape.

The cutting boards shown in the prior art fail to address this hazard. U.S. Pat. No. 5,984,294 issued to Bodomolny discloses a cutting board with a replaceable cutting surface and small traction elements in the form of rubber feet individually attached along the bottom surface of the board. Very little traction is provided.

U.S. Pat. No. 4,930,759 to Potter discloses a cutting board with a spiked platform to engage and retain food to be cut, a knife blade guide, a plurality of channeled depressions on the top surface for the temporary retention of juices and food related debris as opposed to the present invention's raised bottom surface for traction and to prevent slippage created by the planing effect of accumulated fluid in direct contact with the cutting board. Although Potter addresses a retaining element, the device only applies to the item to be cut as opposed to restricting movement of the cutting board apparatus on the countertop.

U.S. Pat. No. 5,527,022 to Gibson discloses a rectangular cutting board with a leveling member composed of small flexible friction material such as rubber feet, located at the four corners of the board. The present invention enhances traction by increasing the number of surface area contacts with a plurality of flexible projections which extend from multiple plates positioned for stability on the underside of the cutting board, also significantly elevating the cutting board assembly above the countertop so as to accommodate the distribution of liquid underneath the cutting board while maintaining stability and non-slippage of the cutting board.

The need arises not only for a cutting board which diminishes the potential for slippage of the board and thus reduces potential for physical injury but also uses a traction member which is easy and inexpensive to manufacture having a plurality of friction contacts to enhance surface area traction in an elevated fashion thereby diminishing the planing effect which occurs when the entire planar baseboard of the cutting board is exposed to the physical presence of liquid. There is further need for a cutting board which is portable, stable, lightweight, structurally simple, economical to manufacture and for consumer to purchase, durable, easy to use, clean and store, and requires no assembly or other equipment.

In these respects, the elevated non-slip wooden cutting board according to the present invention substantially departs from the conventional concepts and designs of the prior art, and in doing so provides an apparatus primarily developed for the purpose of enhancing safety by providing a plurality of surface area traction contacts to retard slippage of the board during the cutting process.

SUMMARY OF INVENTION

A wooden cutting board, for inhibiting movement or slippage on the countertop surface, which is elevated from the surface upon which it rests by the use of a plurality of friction enhancing projections which grip the underlying countertop surface and which are attached to plates which are attached to the bottom of the cutting board.

The cutting board is preferably rectangular in shape (other shapes are feasible) and formed by a cutting board body and in the preferred embodiment four rigid plastic traction plates. The board body is preferably formed from wood (although other suitable materials such as plastic, acrylic, polyethlene, polypropylene, vinyls or other durable, inexpensive, lightweight materials should be considered within the scope of the invention).

Each traction plate is a thin rigid molded plastic plate having on one side three elongated legs, each leg having a plurality of somewhat flexible, circular disks mounted thereto, each perpendicular to the longitudinal axis of the leg, each of the disks being sufficiently small in diameter and flexible to fit snugly into pre-drilled cylindrical holes mounted on one side of the cutting board body, adjacent to each corner. The purpose of the elongated legs and disks are to attach firmly (preferably without glue) the traction plate to the cutting board at each corner. Each traction plate is held in place against the board by the frictional engagement of the three elongated legs and the flexible and resilient disks mounted at the end of each leg in each cylindrical hole in the board body. The attachment legs extend from the upper surface of the plate.

A rubber, rubber-like, or thermo-plastic elastomer (TPE) friction pad is co-molded or over-molded to the bottom surface of the plate. The friction pad includes multiple projections, each having a pre-determined geometrical shape and a flat surface area to contact the counter surface. The bottom surfaces of the projections comprise flat, rubber-like frictional surfaces forming a pattern of friction surface areas that are spaced apart a pre-determined amount to allow liquid to flow in between. In one pattern, the projections could be hexagonal in shape and spaced apart by approximately one-half inch from each other.

The traction plates are positioned preferably at the corners of the cutting board for the greatest stability. Each plate is preferably shaped like a right triangle. Other plate shapes could be employed such as thin rectangular plates near two or more side parallel to the sides, along the width or length of the board. A non-skid surface pad is thermally co-molded (or over-molded) on each traction plate to provide the non-skid projections. The co-molded (or over-molded) pad is constructed from a thermo plastic elastomer or other soft resilient material that has a high coefficient of friction relative to surfaces such as formica, tile or wooden countertops. The array of projections on the pad extend at a substantially ninety degree angle in the preferred embodiment from the bottom of each traction plate. The projection shapes could also be truncated cones, saw tooth, trapezoids or other polygons having surface areas that frictionally engage a counter top with spacing between the projections. Each projection is raised in height approximately 0.25" and is hexagonal in shape.

Each projection is of a sufficient height that allows counter top liquids to flow around the projections. Raising the cutting board above the underlying support surface provides a volume above the countertop surface which is free to accommodate juices and fluids flowing from the cut items, thus avoiding the planing effect which results when a film of liquid is in direct contact with the planar surface of the cutting board body. This reduces the chance for slipping and the potential for physical injury. Additionally, the weight of the cutting board and its contents are concentrated upon the flat projection surface areas that extend from each pad maximizing the gripping power of each projection.

A plurality of at least nine or more non-skid flat end projections per support plate is preferred, depending on the overall dimensions of the plate and the board. Larger support plates are used for larger cutting boards and correspondingly a larger number of larger projections are provided for greater surface area. The total plate area per board could be at least ten percent of the board total surface area for stability and traction.

In an alternate embodiment, the cutting board may be any shape and traction plates and non-skid pads are provided at a plurality of positions along the perimeter of the cutting board. The traction plates can be shaped as squares, rectangles, or other shapes for stability along the bottom surface of the board.

It is an object of the present invention to provide a cutting board with gripping action to reduce board movement and slippage to enable safer cutting of items.

Another object of the instant invention is to provide an easy to construct and economical to manufacture, lightweight, sturdy, portable, and easy to clean wooden cutting board.

Yet another object of the present invention is to provide a lightweight, wooden cutting board that is constructed to firmly but temporarily adhere to the countertop to prevent slippage of the cutting board during the cutting process, yet not mar the countertop.

Another object of the present invention is to provide a cutting board which has an array of spaced apart non skid support projections and is raised sufficiently off of the countertop as to provide an area underneath the cutting board for excess juice or other liquids to flow unimpeded thereby reducing another source of slippage of cutting board.

In accordance with these and other objects that will become apparent hereinafter, the instant invention will now be described with particular reference to the accompanying drawings.

BRIEF DESCRIPTION OF DRAWINGS

FIG. 5 shows a perspective view of the traction plate that includes a pad covering having a plurality of traction projections that are hexagonal in shape.

FIG. 6 shows a perspective view of the plate shown in FIG. 5 inverted 180 degrees.

FIG. 7 shows a partially cutaway side-elevational view in cross section of a portion of a support plate shown in FIG. 5.

FIG. 8 shows a partially cutaway, side-elevational view, in cross section of one leg of the plate shown in FIG. 7.

DETAILED DESCRIPTION

Figure 1:
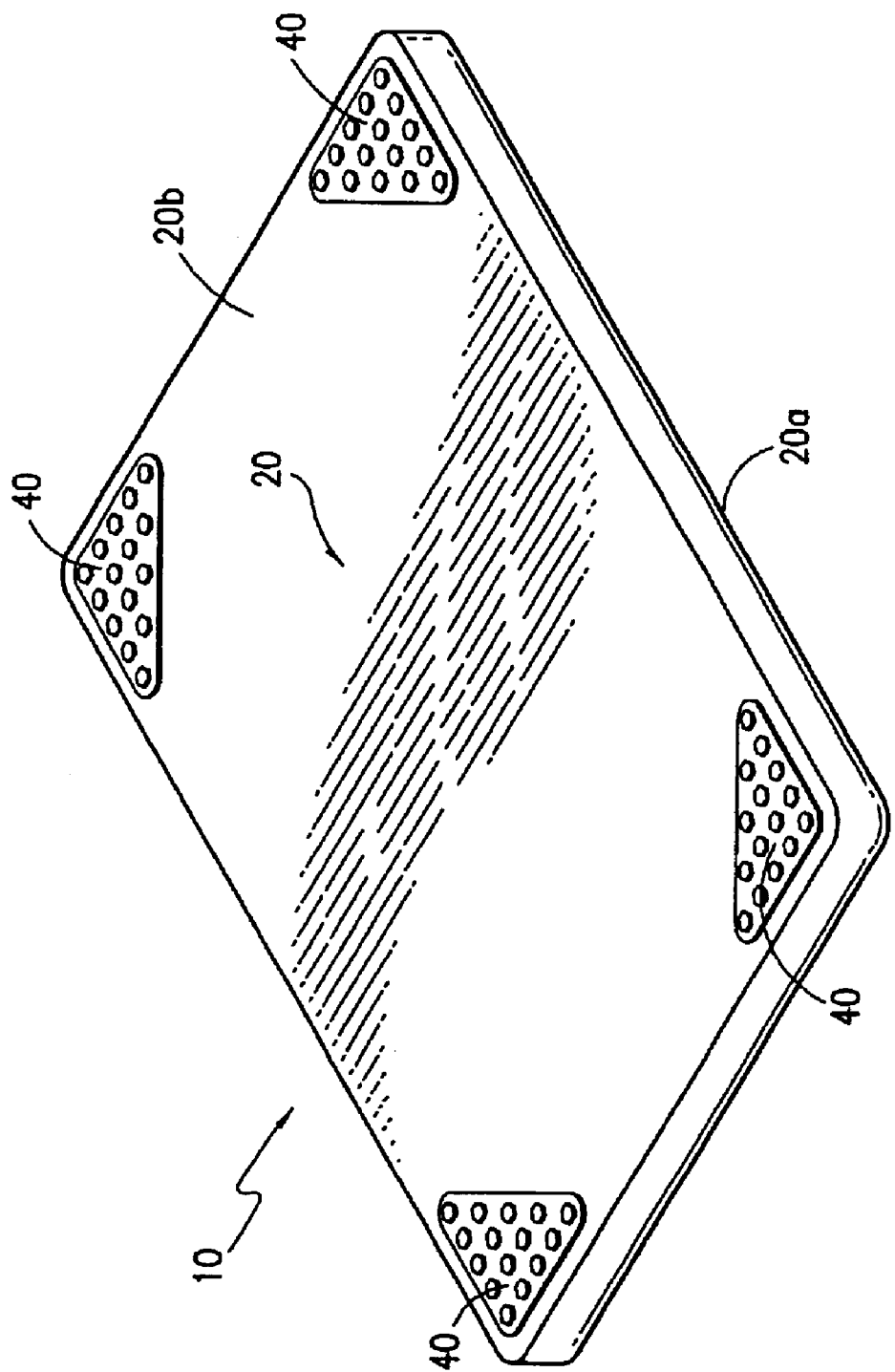
FIG. 1 shows a perspective bottom view of the present invention.

Referring now to FIG. 1, a cutting board 10 formed by a wooden cutting board body 20 and support plates 40. Board body 20 is preferably rectangular in shape measuring approximately 14 inches in length, 11 inches in width, and 1 inch thick and having a substantially planar top cutting surface 20a which opposes a bottom surface 20b. The cutting board body 20 is preferably constructed from wood although other suitable materials such as plastic, acrylic, polyethlene, polypropylene, vinyls or other durable, inexpensive, lightweight materials should be considered within the scope of the invention. Wood is soft enough so as to not damage the knife blade during cutting.

Figure 2:
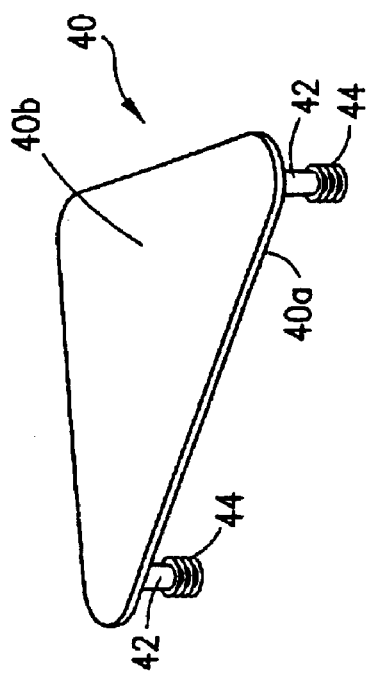
FIG. 2 shows a perspective view of one supporting plate used in the present invention.
Figure 3:
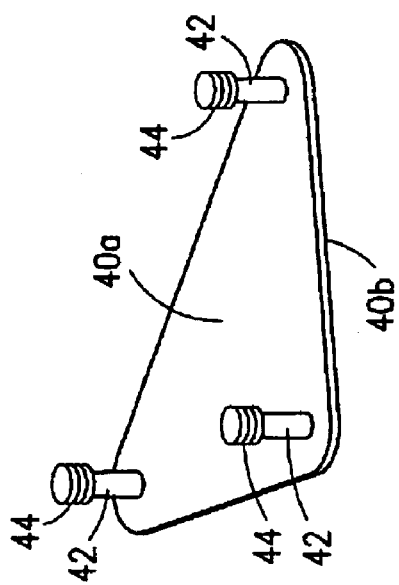
FIG. 3 shows a perspective view of a supporting plate inverted 180 degrees from the figure shown in FIG. 2.
Figure 4:
FIG. 4 shows a side-elevational view in cross section of the cutting board, showing the traction plate apertures preformed in the cutting board.

Referring now to FIG. 2, rigid molded support traction plates 40 having a top surface 40a and a bottom surface 40b are attached to the bottom of cutting board body 10 at the corners of board body 20 for the greatest stability. Support plates 40 are preferably shaped like a right triangle so that the corner areas are efficiently covered and utilized so that traction plates 40 provide maximum contact area. Each plate 40 is molded integrally with three elongated legs 42. Plate legs 42 are tapered and have circular, somewhat resilient and flexible disk-shaped board engagers 44. Traction plates 40 attach to the bottom surface 20b of cutting board 20 by inserting tapered legs 42 into corresponding receiving apertures or cylindrical holes 24 which are sized in depth and diameter to firmly frictionally engage flexible, resilient engagers 44, wedging the disk engagers 44 using frictional pressure in holes 24.

Referring also to FIG. 5, plates 40 are co-molded (or over-molded) with non-skid pads 50 which contact and engage the countertop surface supporting the cutting board when in use. Once co-molded together, the pads 50 are permanently affixed to the plates 40. The traction pad 50 is constructed from a thermo plastic elastomer (TPE), high coefficient of friction, resilient material that provides traction and prevents slipping on a tile, formica, metal or wooden countertop. A plurality of projections 50a extend from the bottom of each traction plate pad 50. Each projection 50a is raised and hexagonal in shape and has a flat end. Each projection 50a is of a height that allows sufficient liquid flow around the projections. Raising the cutting board above an underlying countertop surface provides a space (volume) above the countertop which is free to accumulate juices and other liquids to escape from beneath each projection to allow direct contact with each projection and the countertop.

As shown in FIG. 5, a plurality of at least three projections 50a per traction plate is preferred, depending on the overall dimensions of the plate. Larger traction plates are used for larger cutting boards and correspondingly a larger number of projections are provided as an example. A total of 32 projections each having a flat three-quarter square inch of non-skid surface could provide 24 square inches of non-skid for one wooden cutting board.

Referring now to FIGS. 7 and 8, the traction plate top 40a is shown with legs 42 on one side of the traction plate while the other side shows pad 50 covering the bottom of the traction plate having the plurality or array of raised projections 50a that are basically hexagonal in shape and have flat surfaces. FIGS. 7 and 8 show how the pad 50 which may be a resilient plastic, rubber or rubber-like flexible material that provides for friction and includes the array of raised projections 50a which could be termed studs, posts, raised elements, engaging members or hexagonal polyhedrons. By having these numerous raised projections 50a of known dimensions (which preferably are hexagons, circles, octagons, triangles, squares or rectangles) each having approximately enough non-skid engaging surface area so that the plate 40 as a whole provides forty to fifty percent of countertop engagement surface area of the plate, with the rest being spacing between each of the projections. The precise amount of traction surface area could be varied.

Figure 9:
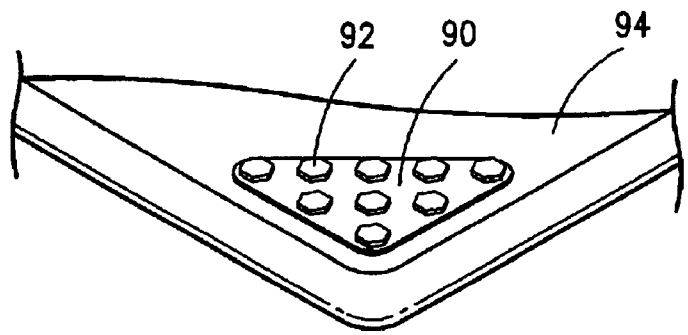
FIG. 9 is a perspective view of an alternate embodiment of the invention.

Looking at FIG. 9, another embodiment of the traction plate is shown with a plate 90 which is triangularly shaped and has the same legs as shown in FIG. 6 with legs 42 and disks 44 (not shown in FIG. 9) but the surface projections 92 are large hexagons with only nine projections being used on a larger surface area. The spacing between the hexagons may still be one half inch.

Figure 10:
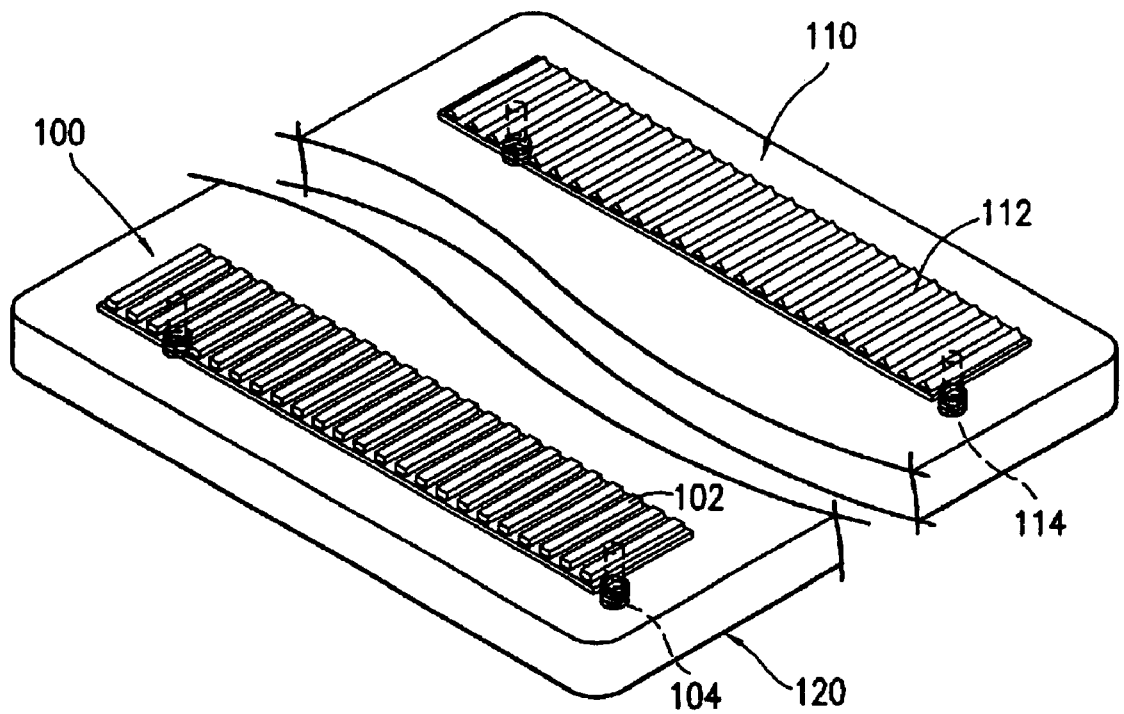
FIG. 10 shows a perspective view with the board being shown in phantom of two alternative traction plates of different geometric shapes that could be used with the present invention.

FIG. 10 shows an alternate embodiment of the invention wherein different shaped traction plates such as plate 100 which is a rectangle that includes a plurality of elongated rectangular projections 120 spaced apart one half inch in a parallel array. Each of the traction plates 100 could be disposed along the width near an edge of the wooden body cutting board on the bottom surface. Also shown in FIG. 10 is another example of a different shaped traction plate 110 that includes projections 112 that are essentially a saw tooth pattern that also includes legs and disks 114. These legs 114 would be mounted in two holes in the board. In the projections 112 shown, an array of surface edges which are the apexes of the triangles which engages the countertop in a resilient manner forming enough contacts to longitudinally and laterally prevent movement. The apexes of each of the triangles of projections 112 are still separated by space to allow fluid to flow in between.

The cutting board could take different shapes and could be circular, triangular, square, rectangular or elliptical, but is conventionally rectangular. The traction plates are made of a rigid molded plastic with the legs and disks being sufficiently resilient for engagement within and to substantially cylindrical holes 24 within the board so that the traction plates will not be removable once inserted. Therefore the overall diameter of the legs of the traction plates are less than the diameter of the holes 24 in the board and the disk 44 diameters may be slightly larger than the diameters of the holes, allowing them to flex upon insertion to be forced into tight engagement when the plate legs 42 are inserted into the wooden board holes 24. The wooden cutting board in accordance with the present invention can be best be constructed in a non-complex manner and does not rely on threaded grooves with screws to hold the traction elements to the board.

The non-skid pad 50 which is a thin layer of resilient thermo plastic elastomer (TPE) is co-molded (or over-molded) to the plate 40 surface. The plate is co-molded with the pad material at the same time so that two different materials are molded together resulting in the plate, the pad material and the raised projections all formed together. In another molding technique, the pad could be subsequently over-molded to an existing plate. Other methods of attachment, thermal adhesive or other known methods may be used to provide each plate with a pad surface that includes a plurality and array of projections for non-skid purposes.

The resulting wooden cutting board can be safely used on a dry or wet surface.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A cutting board comprising:
   a wooden cutting board body having a substantially planar cutting surface; a plurality of non-wooden friction plates each attached to a portion of the bottom of said cutting board body, said plates having a traction surface, said traction surface having a plurality of integrally molded downwardly directed flexible projections covering said traction surface, wherein the weight of the cutting board is concentrated upon the plurality of flexible projections; and means for attaching firmly said friction plates to said board body.

2. The cutting board of claim 1 wherein said means for attachment includes a plurality of tapered extensions extending from the top of said plates, said extensions received by corresponding receiving apertures positioned along the bottom of said board body.

3. The cutting board of claim 1 wherein said means for attachment include a plurality of flexible, resilient disks in vertical orientation connected to each of said extensions for attachable engagement in said board apertures for attaching said plates to said board.

4. The cutting board of claim 1, wherein the friction plates are shaped to correspond with corners of the board body.

5. The cutting board of claim 1, wherein said friction plates are provided at a plurality of positions along the perimeter of said board body.

6. The cutting board of claim 1, wherein the traction surface includes a first material, and each of the plurality of non-wooden friction plates includes a second material, and wherein the traction surface and each of the plurality of non-wooden friction plates are co-molded.

* * * * *